(12) United States Patent
Machida et al.

(10) Patent No.: US 8,566,890 B2
(45) Date of Patent: Oct. 22, 2013

(54) VIDEO INFORMATION CONTROL APPARATUS AND METHOD

(75) Inventors: Yoshihiro Machida, Yokohama (JP); Kouji Kamogawa, Yokohama (JP); Kazunori Iwabuchi, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 914 days.

(21) Appl. No.: 12/622,802

(22) Filed: Nov. 20, 2009

(65) Prior Publication Data

US 2010/0182435 A1 Jul. 22, 2010

(30) Foreign Application Priority Data

Jan. 21, 2009 (JP) ................................. 2009-010498

(51) Int. Cl.
*H04N 7/173* (2011.01)

(52) U.S. Cl.
USPC ............................ 725/105; 725/109; 725/115

(58) Field of Classification Search
USPC .................... 725/105; 345/846, 638
See application file for complete search history.

(56) References Cited

U.S. PATENT DOCUMENTS

| 6,882,350 | B2 | 4/2005 | Asami | |
|---|---|---|---|---|
| 7,096,211 | B2 | 8/2006 | Fujihara | |
| 2002/0054162 | A1* | 5/2002 | Fujihara | 345/846 |
| 2005/0232574 | A1 | 10/2005 | Kawai | |

FOREIGN PATENT DOCUMENTS

| CN | 101013438 A | 8/2007 |
|---|---|---|
| CN | 101046802 A | 10/2007 |
| JP | 11-122638 | 4/1999 |
| JP | 11-196379 | 7/1999 |
| JP | 2001-092752 | 4/2001 |
| JP | 2001-160058 | 6/2001 |
| JP | 2002-123814 | 4/2002 |
| JP | 2002-344897 | 11/2002 |
| JP | 2003-333482 | 11/2003 |
| JP | 2006-331260 | 12/2006 |
| JP | 2007-104540 | 4/2007 |
| JP | 2008-193598 | 8/2008 |
| WO | WO 2004/006572 | 1/2004 |

OTHER PUBLICATIONS

Japanese Office Action for Japanese Patent Application No. 2009-010498, issued on Dec. 11, 2012.

* cited by examiner

*Primary Examiner* — Tuan Ho
*Assistant Examiner* — Quang Le
(74) *Attorney, Agent, or Firm* — Antonelli, Terry, Stout & Kraus, LLP.

(57) ABSTRACT

Video information, which is photographed with using a GPS built-in video camera, is inputted into a video information server. A video information correspondence table is produced, which associated photographing time of the video information inputted, data address of the video information photographed, and photographing position, and is memorized. According to a request from a display apparatus, the memorized video information correspondence table is searched, and thereby obtaining the video information having the information of time and position designated.

7 Claims, 18 Drawing Sheets

FIG. 6

VIDEO INFORMATION CORRESPONDENCE TABLE 508

| STANDARD TIME 501 | VIDEO INFORMATION A | | | VIDEO INFORMATION B | | |
|---|---|---|---|---|---|---|
| | ADDRESS INFORMATION 502 | LATITUDE 503 | LONGITUDE 504 | ADDRESS INFORMATION 505 | LATITUDE 506 | LONGITUDE 507 |
| T_0 | FileA_Of_0 | N_0 | E_0 | FileB_Of_0 | N_0 | E_0 |
| T_1 | FileA_Of_1 | N_1 | E_1 | FileB_Of_1 | N_1 | E_1 |
| T_2 | FileA_Of_2 | N_2 | E_2 | FileB_Of_2 | N_2 | E_2 |
| T_3 | FileA_Of_3 | N_3 | E_3 | FileB_Of_3 | N_3 | E_3 |
| T_4 | FileA_Of_4 | N_4 | E_4 | FileB_Of_4 | N_4 | E_4 |
| T_5 | FileA_Of_5 | N_5 | E_5 | FileB_Of_5 | N_5 | E_5 |
| T_6 | FileA_Of_6 | N_6 | E_6 | FileB_Of_6 | N_6 | E_6 |
| T_7 | FileA_Of_7 | N_7 | E_7 | FileB_Of_7 | N_7 | E_7 |
| T_8 | FileA_Of_8 | N_8 | E_8 | FileB_Of_8 | N_8 | E_8 |
| T_9 | FileA_Of_9 | N_9 | E_9 | | | |
| T_10 | FileA_Of_10 | N_10 | E_10 | | | |
| T_11 | | | | | | |
| T_12 | | | | | | |

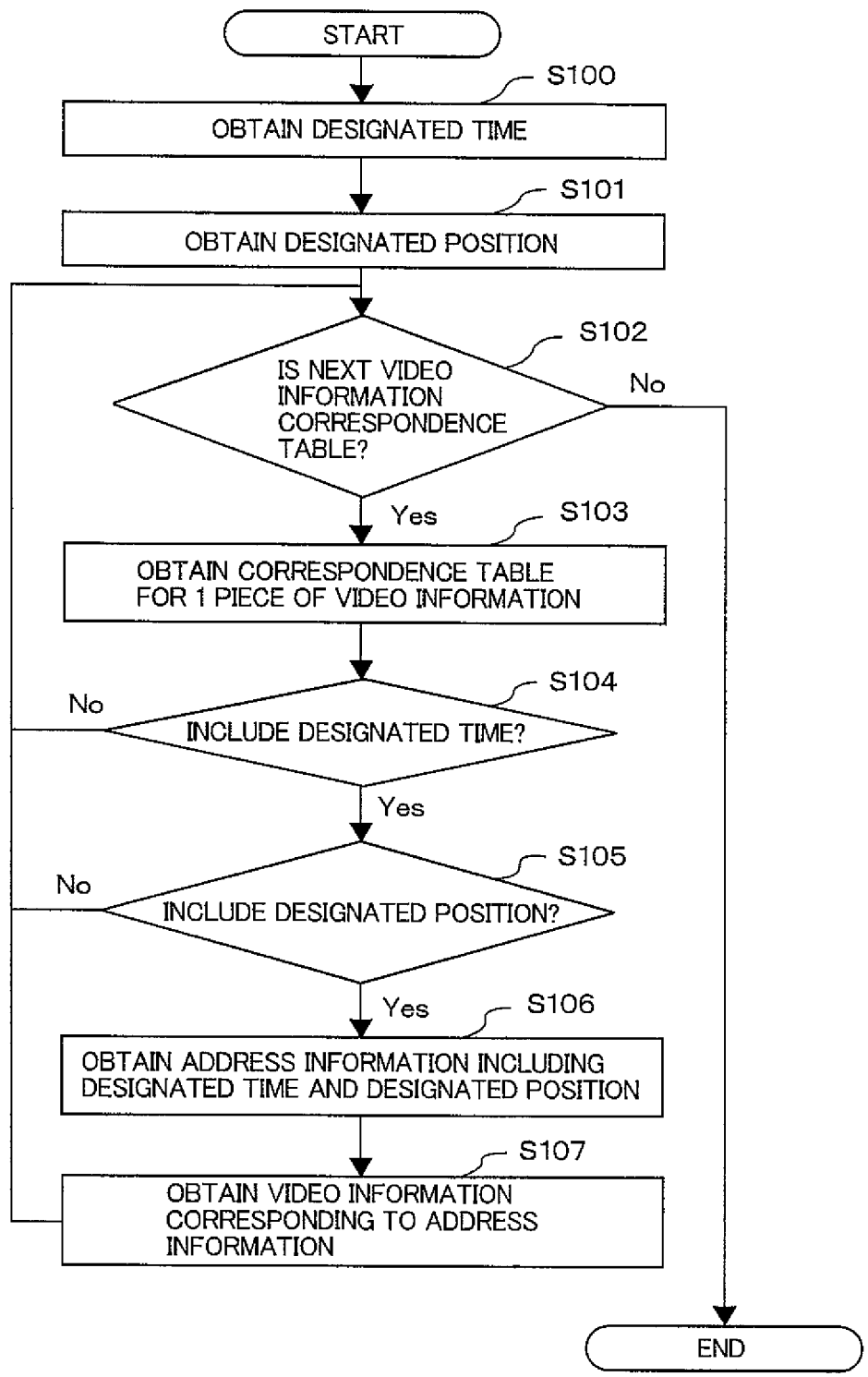

FIG. 8

| STANDARD TIME 501 | VIDEO INFORMATION A | | | VIDEO INFORMATION B | | | |
|---|---|---|---|---|---|---|---|
| | ADDRESS INFORMATION 502 | LATITUDE 503 | LONGITUDE 504 | ADDRESS INFORMATION 505 | LATITUDE 506 | LONGITUDE 507 | |
| T_0 | FileA_Of_0 | N_0 | E_0 | | | | |
| T_1 | FileA_Of_1 | N_1 | E_1 | | | | |
| T_2 | FileA_Of_2 | N_2 | E_2 | FileB_Of_0 | N_0 | E_0 | |
| T_3 | FileA_Of_3 | N_3 | E_3 | FileB_Of_1 | N_1 | E_1 | |
| T_4 | FileA_Of_4 | N_4 | E_4 | FileB_Of_2 | N_2 | E_2 | |
| T_5 | FileA_Of_5 | N_5 | E_5 | FileB_Of_3 | N_3 | E_3 | |
| T_6 | FileA_Of_6 | N_6 | E_6 | FileB_Of_4 | N_4 | E_4 | |
| T_7 | FileA_Of_7 | N_7 | E_7 | FileB_Of_5 | N_5 | E_5 | |
| T_8 | FileA_Of_8 | N_8 | E_8 | FileB_Of_6 | N_6 | E_6 | |
| T_9 | FileA_Of_9 | N_9 | E_9 | FileB_Of_7 | N_7 | E_7 | |
| T_10 | FileA_Of_10 | N_10 | E_10 | FileB_Of_8 | N_8 | E_8 | |
| T_11 | | | | | | | |
| T_12 | | | | | | | |

VIDEO INFORMATION CORRESPONDENCE TABLE 508

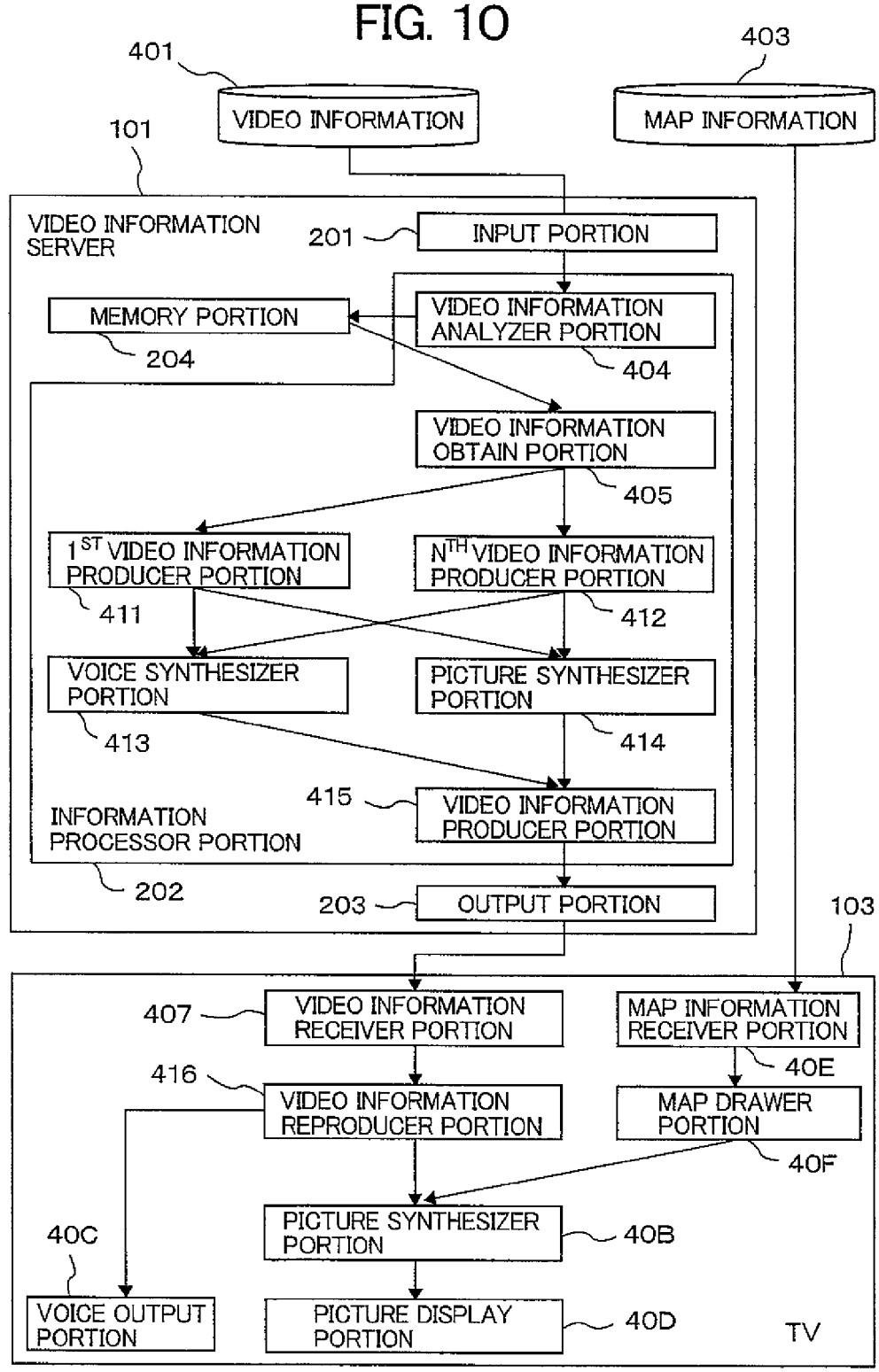

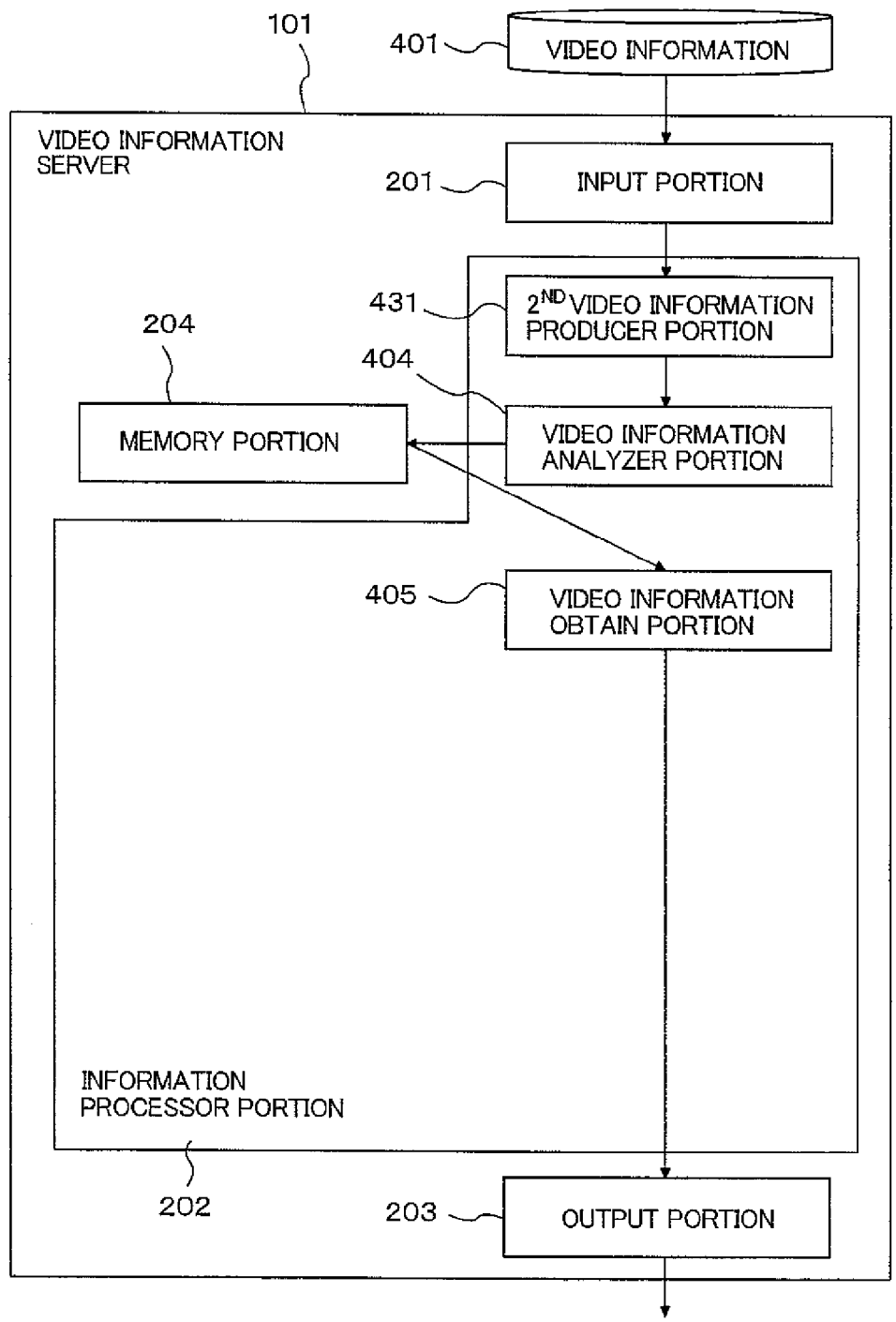

FIG. 16

VIDEO INFORMATION CORRESPONDENCE TABLE 508

| STANDARD TIME 501 | VIDEO INFORMATION | | |
|---|---|---|---|
| | 1ST VIDEO ADDRESS INFORMATION 511 | 2ND VIDEO ADDRESS INFORMATION 512 | LATITUDE 513 | LONGITUDE 514 |
| T_0 | FileA_Of_0 | FileA_Sum_Of_0 | N_0 | E_0 |
| T_1 | FileA_Of_1 | FileA_Sum_Of_1 | N_1 | E_1 |
| T_2 | FileA_Of_2 | FileA_Sum_Of_2 | N_2 | E_2 |
| T_3 | FileA_Of_3 | FileA_Sum_Of_3 | N_3 | E_3 |
| T_4 | FileA_Of_4 | FileA_Sum_Of_4 | N_4 | E_4 |
| T_5 | FileA_Of_5 | FileA_Sum_Of_5 | N_5 | E_5 |
| T_6 | FileA_Of_6 | FileA_Sum_Of_6 | N_6 | E_6 |
| T_7 | FileA_Of_7 | FileA_Sum_Of_7 | N_7 | E_7 |
| T_8 | FileA_Of_8 | FileA_Sum_Of_8 | N_8 | E_8 |
| T_9 | FileA_Of_9 | FileA_Sum_Of_9 | N_9 | E_9 |
| T_10 | FileA_Of_10 | FileA_Sum_Of_10 | N_10 | E_10 |
| T_11 | | | | |
| T_12 | | | | |

VIDEO INFORMATION CONTROL APPARATUS AND METHOD

INCORPORATION BY REFERENCE

This application relates to and claims priority from Japanese Patent Application No. 2009-010498 filed on Jan. 21, 2009, the entire disclosure of which is incorporated herein by reference.

BACKGROUND OF THE INVENTION

The present invention relates to, in connection with picture information distribution with use of a picture recording apparatus and/or picture display equipment, such as, a video camera, a portable phone (i.e., a mobile phone), TV, PC, etc., a control method and a display method having time information and position information, and in particular, to a video information search apparatus for enabling to search desired video information among a large amount or volume of video (moving picture) information, easily, with displaying the video information coincident with a designation on a map, by designating the time and the position thereof.

In recent years, accompanying with wide spread of digital cameras and/or personal computers, an electronic album with using a computer comes to be common, and also there are provided various kinds of services for commonly sharing pictures through the Internet with high-speed network. For example, there is a method for displaying the picture information, which is picked up by means of a digital camera having a GPS receiver, on a three-dimension (3-D) map, with designating the time (for example, please see the following Patent Document 1).

[Patent Document 1] Japanese Patent Laying-Open No. Hei 11-122638 (1999).

SUMMARY OF THE INVENTION

However, with the method described in the Patent Document 1, the 3D map of the background is moved depending on a viewpoint of pickup of one piece of video, and then there is a drawback that it is impossible to achieve a way of use of a multi-angles displaying for displaying a plural number of pictures, simultaneously, which are picked up at a plural number of positions at the same time.

Then, an object of the present invention is to provide a video information control apparatus and a method, for extracting only the video information, which are picked up at a specific position or place and at a specific time, among a large amount or volume of unspecified video (moving picture) information, which are picked up at an unspecified time and at an unspecified position, and the positions of which are moving during the image picking-up operation thereof.

For accomplishing the object mentioned above, according to the present invention, there is provided a video information control apparatus or method, for controlling video information having photographing time information and photographing position information therein, comprising: an input portion, which is configured to input said video information; an information processor portion, which is configured to produce a video information correspondence table, for associating the photographing time of said video information inputted from said input portion, a data address of said video information, which is photographed at said photographing time, and a photographing position; a memory portion, which is configured to memorize said video information inputted from said input portion, and said video information correspondence table, which is produced in said information processor portion; and an output portion, which is configured to output said video information, wherein said information processor portion obtains the data address of said video information having a specific photographing time, from said video information correspondence table, which is memorized in said memory portion, and obtains said video information corresponding to the data address obtained; and outputs said video data obtained from said output portion.

According to the present invention mentioned above, it is possible to extract only the video information, which is picked up at the specific position and at the specific time, among the video information of that large volume of the unspecified video information, which are picked up at the unspecified time and at the unspecified position, and the positions of which are moving during the image picking-up operation thereof.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 6 shows an example of a correspondence table of video information in the first embodiment;

FIG. 7 shows an example of a flowchart according to the first embodiment;

FIG. 8 shows an example of a method for data processing to be conducted within the first embodiment;

FIG. 10 shows an example of data flow in a second embodiment;

FIG. 15 shows an example of data flow in a fourth embodiment;

FIG. 16 shows an example of video layers according to the fourth embodiment;

DETAILED DESCRIPTION OF THE PREFERRED EMBODIMENTS

Hereinafter, embodiments according to the present invention will be fully explained by referring to the attached drawings.

<Embodiment 1>

Figure 1:
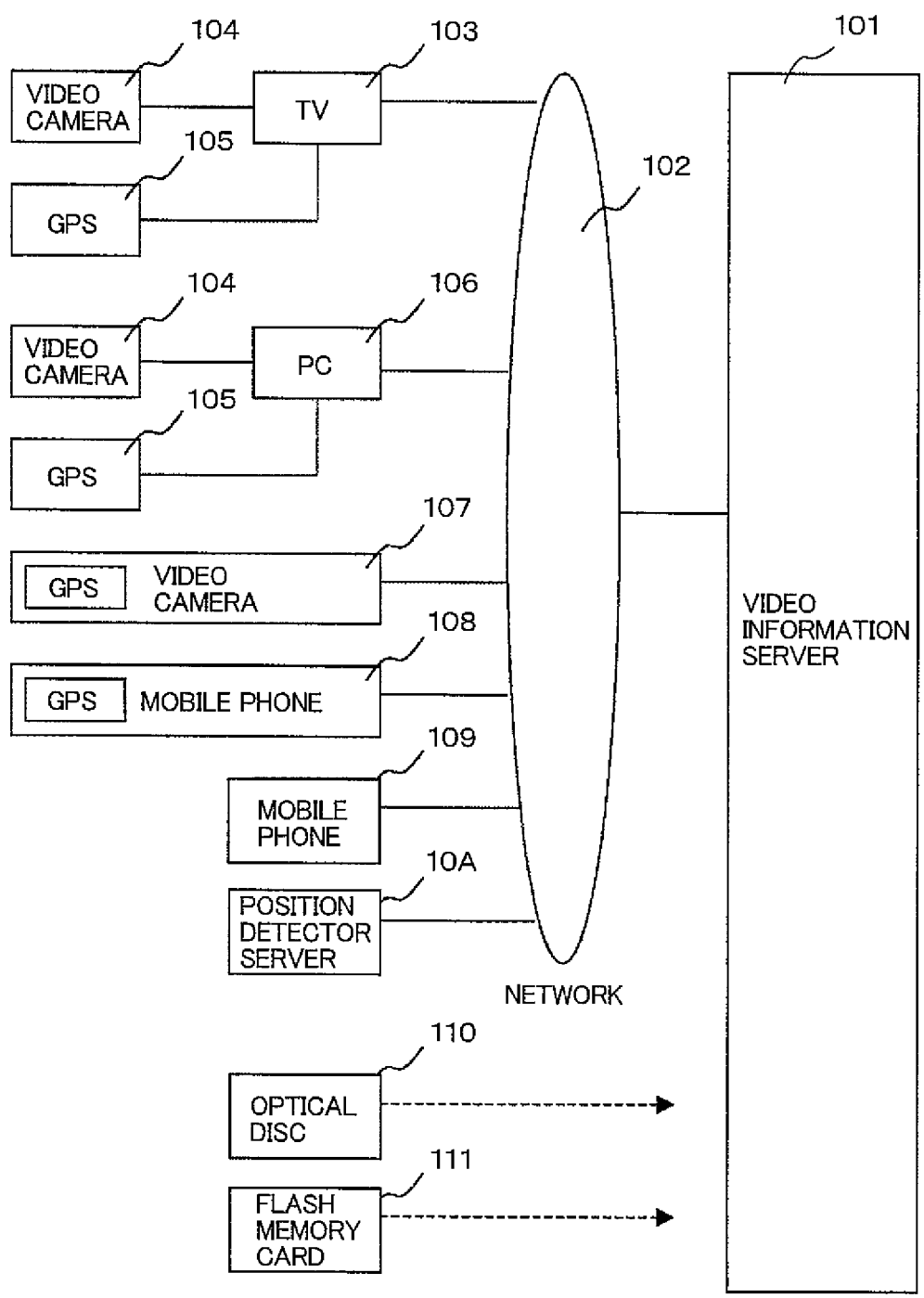
FIG. 1 is the configuration view of a system as a whole, according to an embodiment of the present invention.

FIG. 1 shows an example of the configuration of a system, as a whole.

First of all, explanation will be made on a method, in particular, when applying the GPS for detecting position information and time information in production of the video information having pickup time information and pickup position information.

While recording the video information by means of a video camera 104, the time information and the position information are recorded by means of a GPS (Global Positioning System) attached recording apparatus 105, wherein the video information, the time information and the position information are related to as one unit by means of a TV with a recording function 106 or a PC (Personal Computer) 106.

With using a GPS built-in video camera 107, or a portable or mobile phone 108 of GPS built-in and having video pickup function, it is possible to record the video information having time and position information by using one (1) set of an apparatus.

On the mobile phones, there is also a way for detecting the position information from a positional relationship between a base station. In this case, the position of the mobile phone 109 having the video pickup function is detected by a position detector server 10A, the position information of which is noticed to the mobile phone 109, it is possible to produce the video information having photographing position information. Also the time information may be noticed from the position detector server 10A, or the mobile phone may have a clock (or timer) function by itself.

The picked-up video information having the photographing time information and the photographing position information, in the example mentioned above, are inputted into a video information server 101 through a network 102, to be memorized therein.

The video information may be inputted with using a removable medium, such as, an optical disc 110, or a semiconductor disc 111.

Hereinafter, detailed explanation will be made upon the functions, which are provided by the video information server in order to search the video information desired by a user, among a large amount or volume of unspecified video information, which are recorded within the video information server 101 achieving the present embodiment, and thereby to read or peruse it on the TV 103 or the PC 106.

Figure 2:
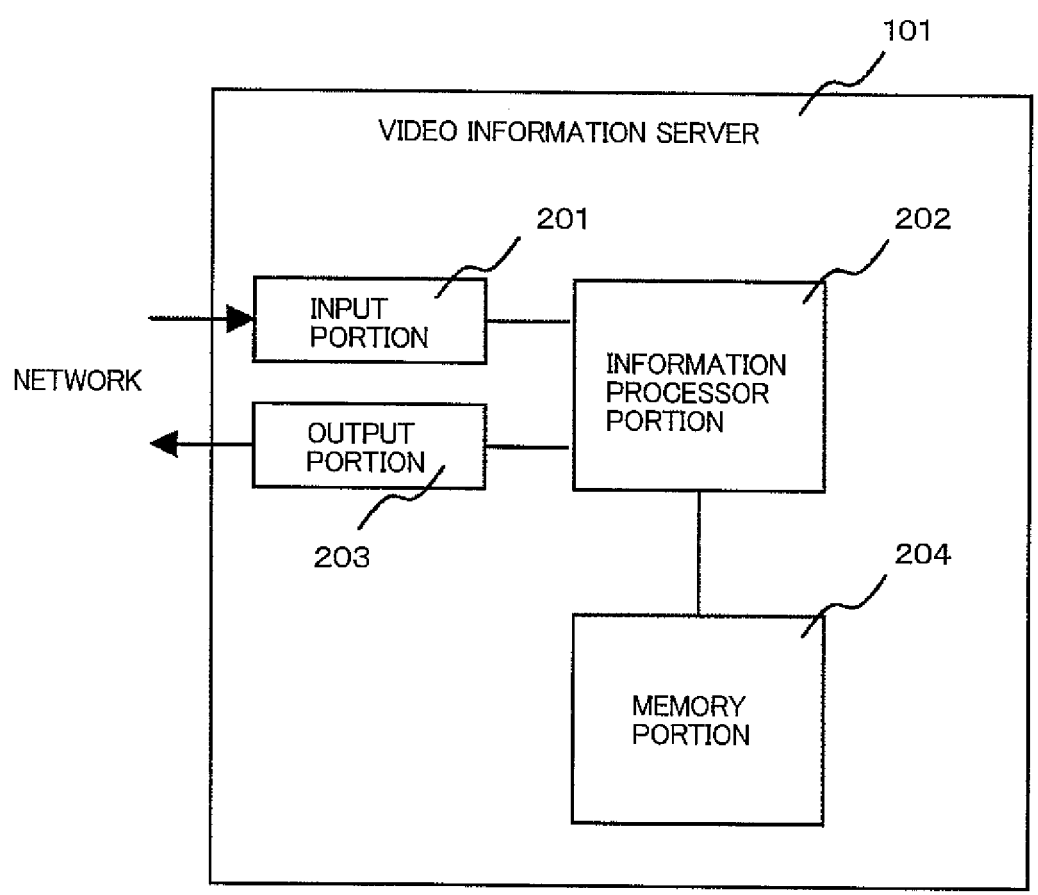
FIG. 2 shows an apparatus for achieving a first embodiment.

FIG. 2 is a view for showing an example of the structures of the server 101.

An input portion 201 is provided for inputting the vide information.

An information processor portion 202 produces a correspondence table of video information (hereinafter, a video information correspondence table), which relates or associates the photographing time of the video information inputted through the input portion 201, an address data of the video information, which is photographed at that photographing time, and the photographing position, to be recorded within a memory portion 204 together with the video information.

The information processor portion 202 obtains the data address of the video information having the specific photographing time and photographing position, among the video information correspondence table, which is memorized in the memory portion 204, so as to obtain the video information corresponding to the data address obtained, and thereby outputting it from an output portion 203.

The information processor portion 202 provides no output, or alternately, it outputs video information that there is no video information to be targeted, from the output portion 203, in case when no video information having the specific photographing time and photographing position is memorized in the memory portion 204, i.e., there is no video information to be targeted.

However, although there is provided only one (1) set the input portion 201, in the structures of the present embodiment, but as is shown in FIG. 1, the video information may be inputted from the removable medium, such as, the optical disc 110 or the semiconductor disc 111, etc., for example, other than inputting it from the network 102, and there may be provided a plural number of input portions.

Figure 4:
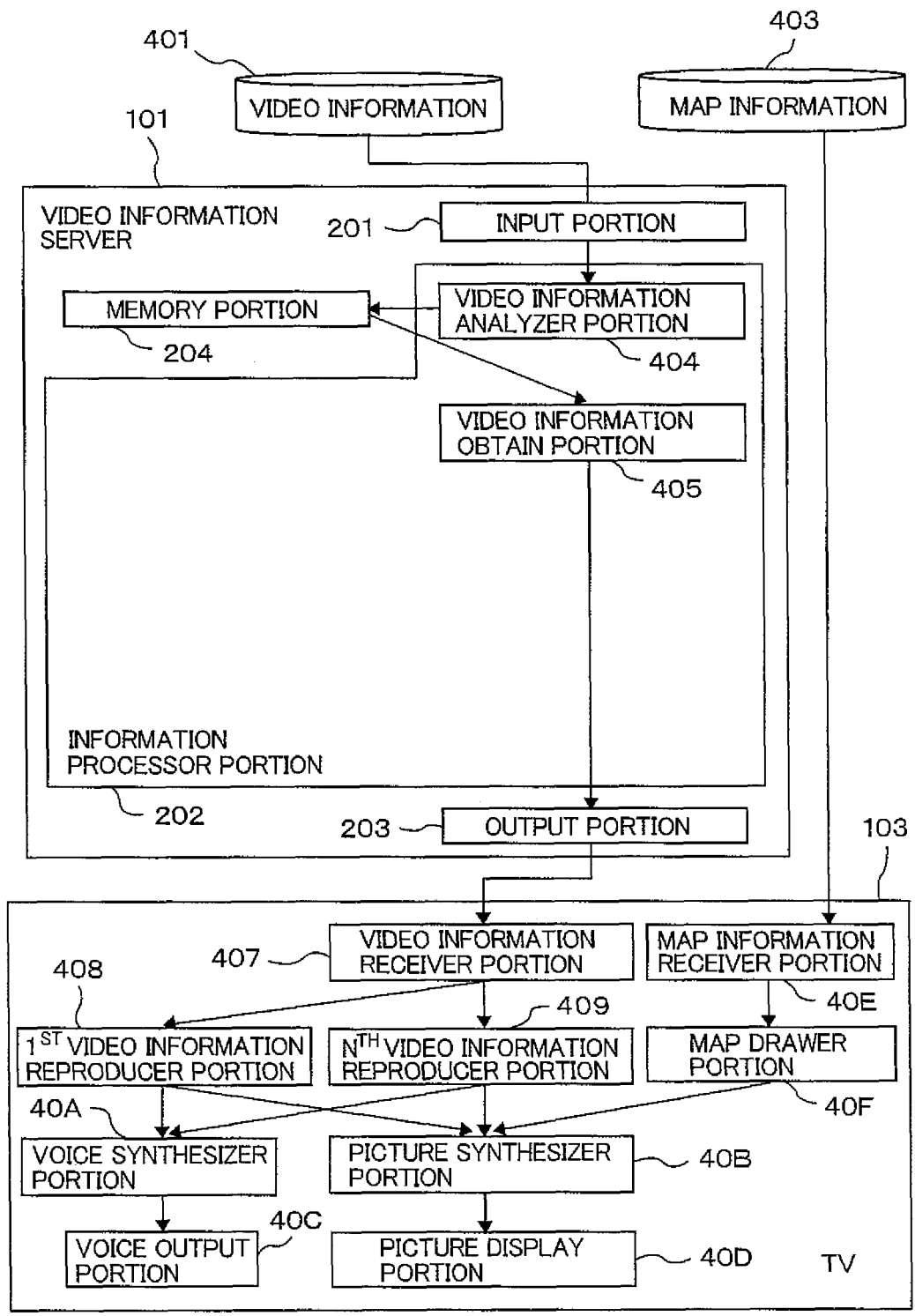
FIG. 4 shows an example of data flow in the first embodiment.

FIG. 4 shows an example of data flow in a first embodiment.

Video information 401 are inputted into the input portion 201 within the video information server 101, successively, passing through the network or the removable medium.

Upon the video information inputted, a video information analysis portion 404 within the information processor portion 202 conducts an analyzing process, for associating the photographing time, the data address of the video information photographed, and the photographing position, and thereby producing the video information correspondence table.

The video information correspondence table is memorized within the memory portion 204.

For example, when the time and the position are designated by a user of the TV 103 that is the perusal apparatus, they are noticed to a video information obtain portion 405 in the information processor portion 202, through the network 102.

The video information obtain portion 405 obtains the data address of the video information having the information about the time and the position, which are designated, from among the video information correspondence table memorized in the memory portion 204, and also obtains the video information corresponding to the data address obtained.

The video information obtain portion 405 outputs the video information obtained, from the output portion 203 to the TV 103.

The video information outputted is received by a video information receiver portion 407 within the TV 103, and for each of the received information, the time information is synchronized with it, within those from a first video information reproducer portion 408 to a N-th video information reproducer portion 409. In this instance, map information, which is coincident with the position designated by the user, is received by a map information receiver portion 40E. The map information may be obtained through the network, or may be used that memorized inside the TV.

The map information, which is received by the map information receiver portion 40E, is drawn within a map drawer portion 40F.

Voices or sounds, which are reproduced within those from the first ($1^{st}$) video information reproducer portion 408 to the $N^{th}$ video information reproducer portion 409, are synthesized within a voice reproducer portion 40A, respectively, while the pictures are synthesized with the map, which are drawn within the map drawer portion 40F, in a picture synchronize portion 40B, to be fit with the position information owned by the video information.

The voices synthesized are outputted from a voice output portion 40C, while the pictures synthesized are displayed on a picture display portion 40D.

Figure 5:
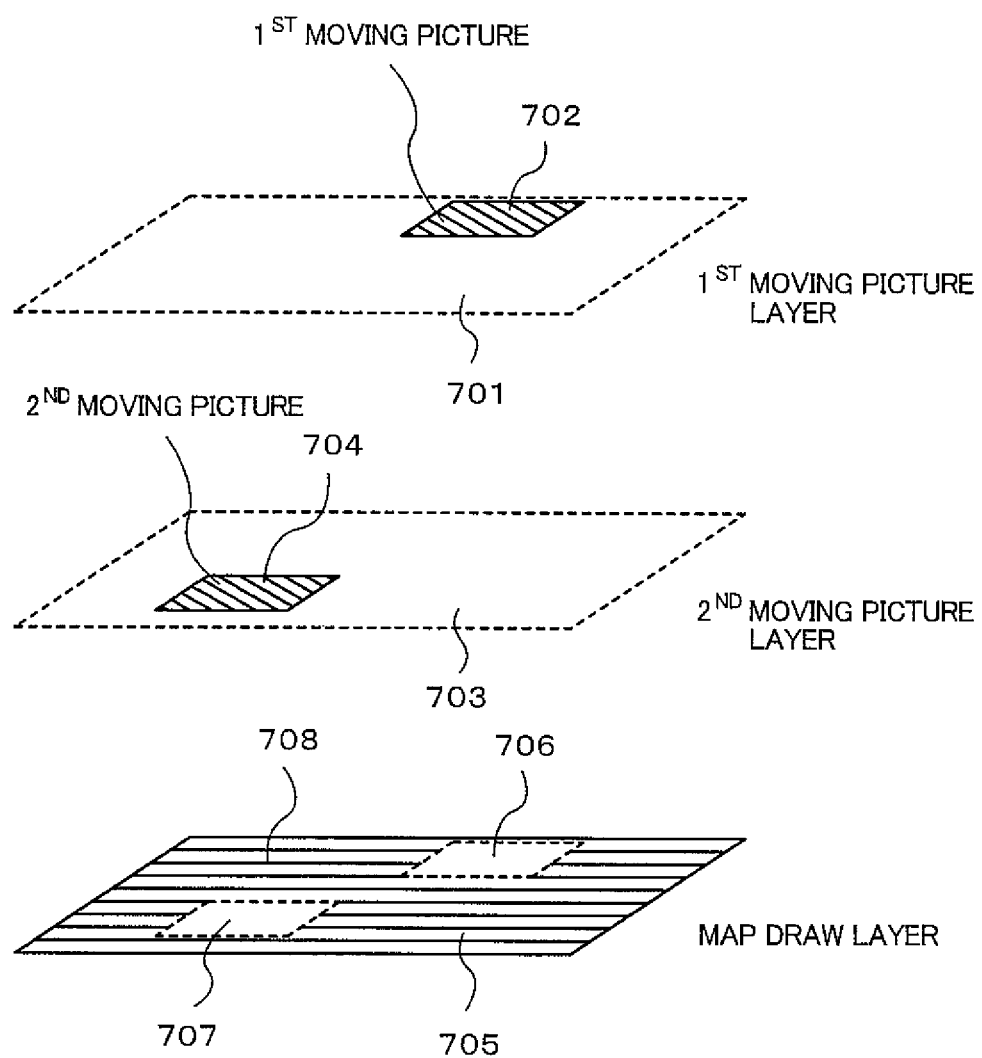
FIG. 5 shows an example of video layers according to the first embodiment.

FIG. 5 shows an example of picture layers in case where two (2) pieces of the video (moving picture) at a specific time and the map are synthesized within the picture synthesizer portion 40B.

The map is drawn on a map drawn layer 705.

A first video 702 of moving picture, which is reproduced on a first moving video layer 701, is disposed at a position corresponding to the latitude and the longitude of a map display area 708, which is drawn on the map draw layer 705, for example, fitting to a central point of the picture. When enlarging or reducing the picture, a magnitude may be fixed, or may be automatically done so that it is displayed within a display region, fitting to a total number of the pictures. Others than the area where the first moving video 702 is disposed therein come to be transmission areas.

In the similar manner, a second moving video 704, which is reproduced on a second moving video layer 703, is disposed, fitting to the position on the map of the map display area 708, which is drawn on the map draw layer 705. Others than the area where the second moving video 704 is disposed therein come to be transmission areas.

Finally, the map draw layer 705 and the first moving video layer 701, and the second moving video layer 703 are put on one another, so that the first moving video 702 is put on a first moving video display area 706, and the second moving video 704 is put on a second moving video display area 707, and thereby the moving video having the position information is displayed on the map. However, if the photographing position is changed in accordance with development of the time information, then the position information also changes, so that the picture moves on the map. The position of the voices may be changed fitting to the position of the picture.

FIG. 6 shows an example of the video information correspondence table 508, which is produced for two (2) pieces of the video information, within the video information analysis portion 404 in the information processor portion 202, which was shown in FIG. 4.

Video information A is picked up or photographed within a range from T_0 of standard time to a time of T_10, and the address information 502, at which the photographing is made at each standard time, are from FileAOf_0 to from FileAOf_10, wherein the photographing positions (the latitude) 503 are N_0 to N_10, and the photographing positions (the longitude) 504 are E_0 to E_10.

Video information B is picked up within a range from T_4 of standard time to a time of T_12, and the address information 505, at which the photographing is made at each standard time, are from FileBOf_0 to from FileBOf_8, wherein the photographing positions (the latitude) 506 are N_0 to N_8, and the photographing positions (the longitude) 507 are E_0 to E_8.

For example, at the standard time T_6, the followings can be seen:

The video information A is FileAOf_6 of the address information 502 thereof, and is photographed at a photographing position at N_6 of the latitude 503 and E_6 of the longitude 504; and The video information B is FileBOf_2 of the address information 505 thereof, and is photographed at a photographing position at N_2 of the latitude 506 and E_2 of the longitude 507.

It is needless to say that, even if the video information are more than three (3) pieces, correspondence may be made with each other, in the similar manner.

However, if applying the GPS, for example, since also altitude (height) information and/or direction information, etc., can be detected other than the time information and the position information, then those information may be recorded together with them.

FIG. 7 shows an example of flowchart of processes, for the video information obtain portion 405 within the information processor portion 202, which was shown in FIG. 4, to obtain the video information having the specific time and the time from the memory portion 204.

First of all, when designation is made on the time by a user of an apparatus for displaying the video information, such as, the TV 103, for example, it is noticed into the information processor portion 202 through the network 102, and then the time is obtained within the video information obtain portion 405 (step S100).

The method or manner of designating the time may be made, by designating by a starting time and an ending time thereof.

In the similar manner to that of the step S100, the designated position is obtained. The manner of designating the position may be made, for example, through an area designation by means of an address, a landmark designation by means of a building, etc., and finally, it is sufficient to designate the latitude and the longitude thereof (step S101).

Further, the sequential order of the steps S100 and the step S101 may be reversed, or may be executed by one (1) step.

Among the video information correspondence table 508, a correspondence table is searched for each of the video information, sequentially, and if there is the video information therein, the process advances into a step S103, and if there is no table, then the process is ended or completed (step S102).

A table for one (1) piece of the video information is obtained from among the video information correspondence table (step S103).

Search is made on whether the video information correspondence table, which was obtained in the step S103, includes or not the time, which was obtained in the step S100, and if there is, the process advances into a step S105, but on the other hand if there is no time, then the process turns back to the step S102 (step S104).

Search is made on whether the information of position, which is obtained in the step S101, within the region of the video information correspondence table including the designated time searched in the step 104 therein, and if there is that information, the process advances into a step S106, but on the other hand if there is no information, then the process turns back to the step S102 (step S105).

The data address of the video information is obtained, including the designated time and the designated position, which are searched in the step S105 (step S106).

The video information corresponding to the data address, which is obtained in the step S107, is obtained, and the process turns back to the step S102 (step S107).

FIG. 8 shows an example of the data processing method to be conducted in accordance with the flowchart, which was explained above in FIG. 7.

In a step S100, times from T_1 to T_9 of the standard time are obtained, and in a step S101 is conducted an area position designation on N_2 to N_6 of the latitude and E_2 to E_6 of the longitude.

In a step S102, confirmation is made on presence of the video information A and the video information B, and the following processes will be conducted, sequentially.

In a step 103, the video information correspondence table is obtained for the video information A.

In a step 104, it can be seen that the video information A includes the time information from T_1 to T_9 of the standard time.

In a step S105, it can be seen that, within the range from FileAOf_1 to FileAOf_9 of the address information 502 of the video information A, which was searched in the step S104, are included the position information; i.e., from N_2 to N_6 in the photographing position (latitude) 503 and from E_2 to E_6 in the photographing position (longitude) 504.

In a step S106, FileAOf_6 is obtained from FileAOf_2 of the address information 502 of the video information A, which was searched in the step S105.

In a step S107, the video information is obtained, corresponding to the address information 502 of the video information A, which was obtained in the step S106.

In the similar steps as mentioned above, FileAOf_5 is obtained from FileAOf_2 of the address information 502 of the video information B, and also is obtained the video information corresponding thereto.

In the step S102, confirmation is made that there if no next video information, and then is ended the process.

Although the explanation was given on the method for searching the video information, which were already memorized, sequentially, in the present embodiment, but it is also possible for the video information obtain portion 405 to deal with a plural number of video information, and thereby achieving high speed thereof. Also, with simultaneous and parallel dealing of the plural number of the video information by the video information obtain portion 405, it is possible to conduct the steps from the step S102 to the step S107, simultaneously and in parallel with, and thereby obtaining the video information in the step S107, as well as, starting the reproduction.

It is also possible that only the time for starting is designate, so as to search the video information, which are under the memorization thereof.

Figure 9A:
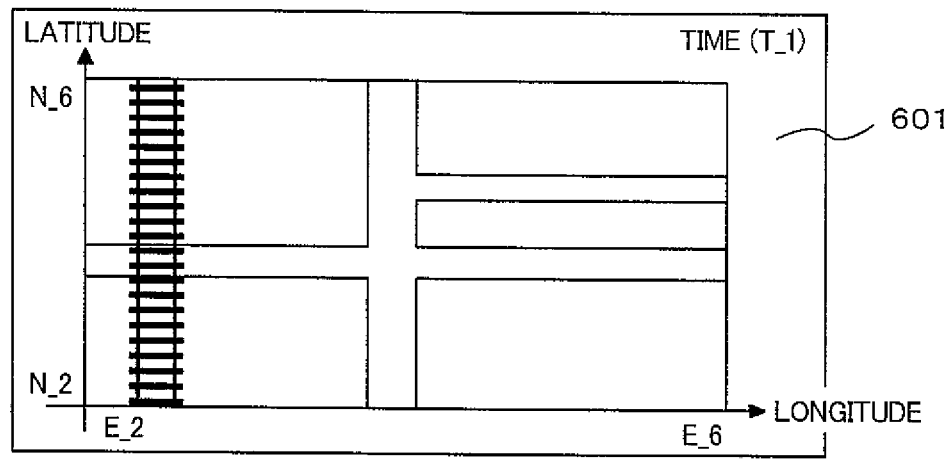
FIGS. 9A to 9C show an example of a display in the first embodiment.
Figure 9B:
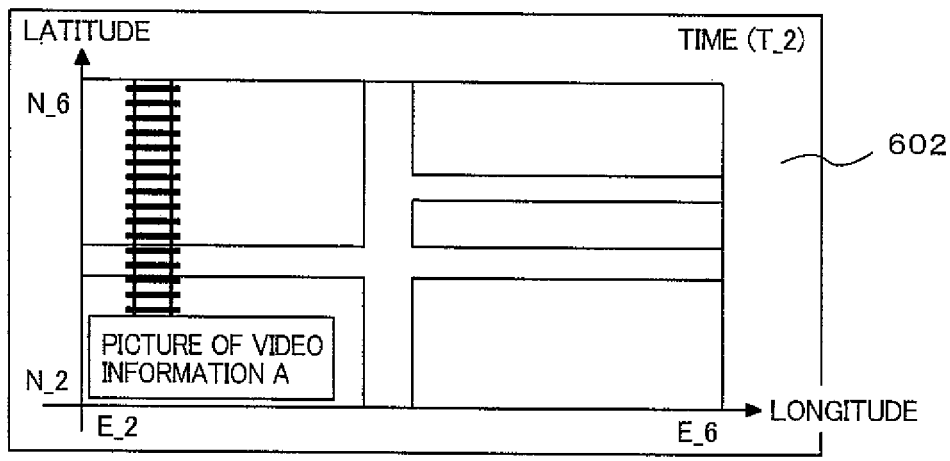
Figure 9C:
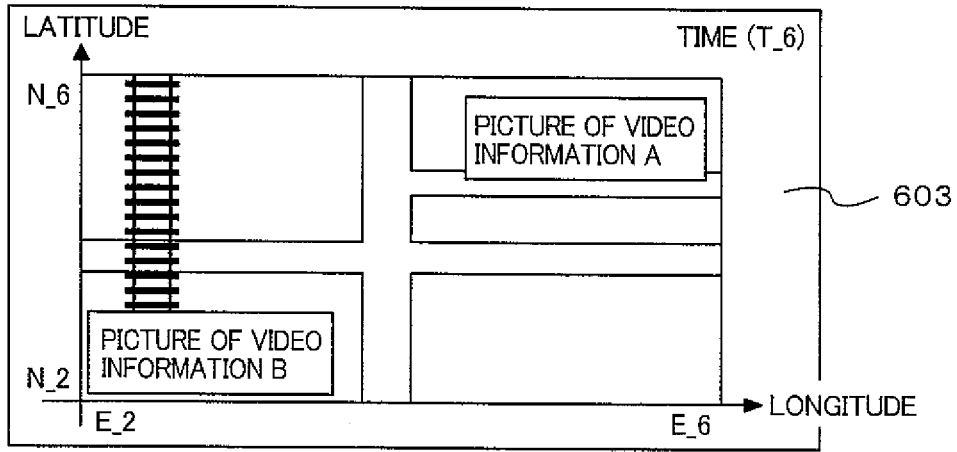

FIG. 9 shows an example of display on the TV 103, when obtaining the video information, which was explained by referring to FIG. 8.

On a screen display 601 of T_1 of the standard time 501, since there is no picture having the position information designated, only the map is displayed on the screen.

On a screen display 602 of T_2 of the standard time 501, the picture of the FileAOf_2 of the address information 502 of the video information A is displayed at the position of the latitude N_2 and the longitude E_2 on the map, fitting to the photographing position (latitude) 503 and the photographing position (longitude) 504 of the video information A.

On the screen display 603 of T_6 of the standard time 501, the picture of FileAOf_6 of the address information 502 of the video information A is displayed at the position of the latitude N_6 and the longitude E_6 on the map, fitting to the photographing position (latitude) 503 and the photographing position (longitude) 504 of the video information A, and the picture of FileBOf_2 of the address information 505 of the video information B is displayed at the position of the latitude N_2 and the longitude E_2 on the map, fitting to the photographing position (latitude) 506 and the photographing position (longitude) 507 of the video information B.

According to the present embodiment, among the video information including a large number of unspecified pictures and voices, photographing of which is done at an unspecified time and an unspecified position, and also the position of which is moving during the photographing, it is possible to extract only the video information, which is photographed at a specific place and at a specific time, and thereby to display the picture.

<Embodiment 2>

FIG. 10 shows data flow, according to a second embodiment.

The information processor portion 202 comprises, in addition to those of the first embodiment, a first ($1^{st}$) video information reproducer portion 411 to a $N^{th}$ video information reproducer portion 412, a voice synthesizer portion 413, a picture synthesizer portion 414, and a video information producer portion 415.

The video information obtain portion 405 obtain at least one (1) piece of the video information having the information of the designated time and the position, among the video information memorized in the memory portion 204, and it reproduces, with synchronizing with the time information within each of the first video information reproducer portion 411 to a $N^{-th}$ video information reproducer portion 412, for each of the video information. Each of the voices reproduced is synthesized in the voice synthesizer portion 413, and the picture is synthesized in the picture synthesizer portion 414 fitting to the position information owned by the video information. From the synthesized video and the voice, one (1) piece of the video information is reproduced in the video information producer portion 415.

The video information reproduced is outputted from the output portion 203 to the TV 103.

The video information outputted is received by video information receiver portion 407 within the TV 103, and is reproduced within a video information reproducer portion 416. According to the present embodiment, since the synthesizing of the video information is conducted in the video information server 101, there is no necessity of plural number of the video information reproducer portions, nor the voice synthesizer portion.

In the present embodiment, the TV 103 is presumed to be the display apparatus, but it may be a PC 108 or the mobile phone 109. Also, fitting to the screen size of the display apparatus or an expanding method for reproducing, it is possible to change the voice synthesizer portion 413, the picture synthesizer portion 414, and also the screen size, which is synthesized in the video information producer portion 415 and/or a compression method.

Other details are same to those shown in the first embodiment shown in FIG. 4, and therefore explanation thereof will be omitted herein.

Figure 11:
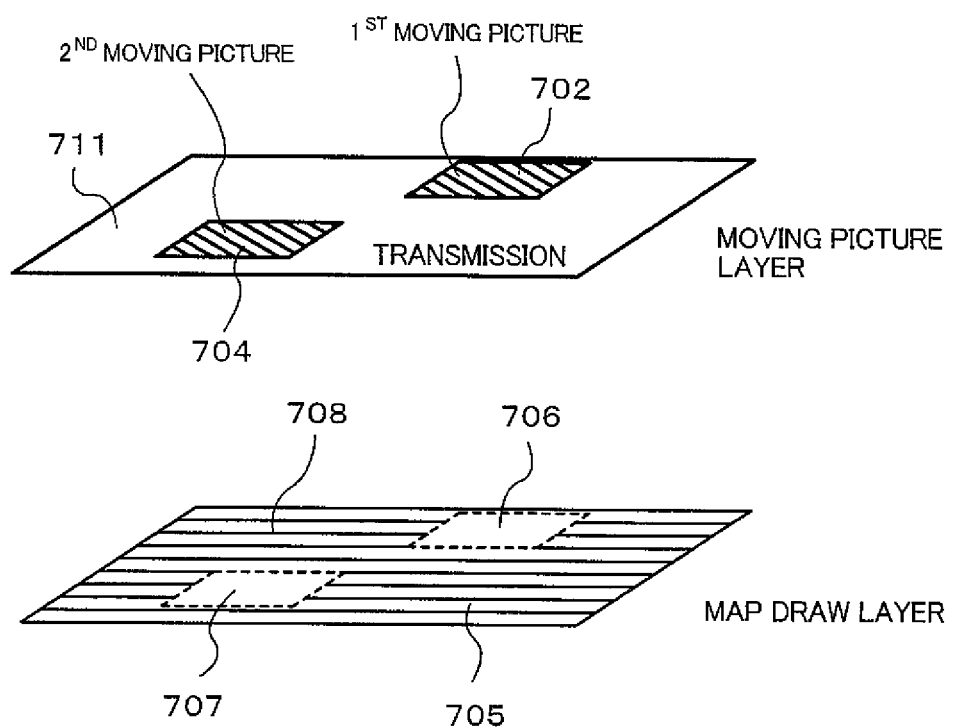
FIG. 11 shows an example of video layers according to the second embodiment.

FIG. 11 shows an example of a picture layer when synthesizing two (2) pieces of the video information and a map in the picture synthesizer portion 40B shown in FIG. 10.

The map is drawn on the picture draw layer 705.

On a moving picture layer 711 is displayed a reproduced picture of one (1) piece of the video information, which is produced by synthesizing in the video information server 101. The contents thereof include a first picture 702, being disposed fitting to the position on the map in a map display area 708, which is drawn on the picture draw layer 705, and a second picture 704, wherein the other areas than those, where the first picture 702 and the second picture 704 are disposed, come to be the transmission area.

Finally, by piling up the moving picture layer 711 on the map draw layer 705, the first picture 702 is piled up upon the first picture display area 706 on the map draw layer 705, and the second picture 704 is piled up upon the second picture display area 707, and then the picture is displayed on the map.

Other details are same to those of the first embodiment, and therefore explanation thereof will be omitted herein.

According to the present embodiment, in addition to the effects obtainable in the first embodiment, since the synthesizing of the video information is conducted within the video information server 101, there is no necessity of plural number of the video information reproducer potions in the TV 103, as the perusal apparatus, nor the voice synthesizer portion. Also, only one (1) piece of the video information is outputted from the video information server 101, and therefore it is possible to reduce an amount or volume of information to be transmitted, comparing to the case of outputting the plural number of the video information.

Also, by changing the screen size and the compression method, fitting to the screen size of the apparatus, on which the perusal is made, or the expansion method corresponding thereto, it is possible to support or deal with many kinds of peruse apparatuses.

<Embodiment 3>

Figure 13:
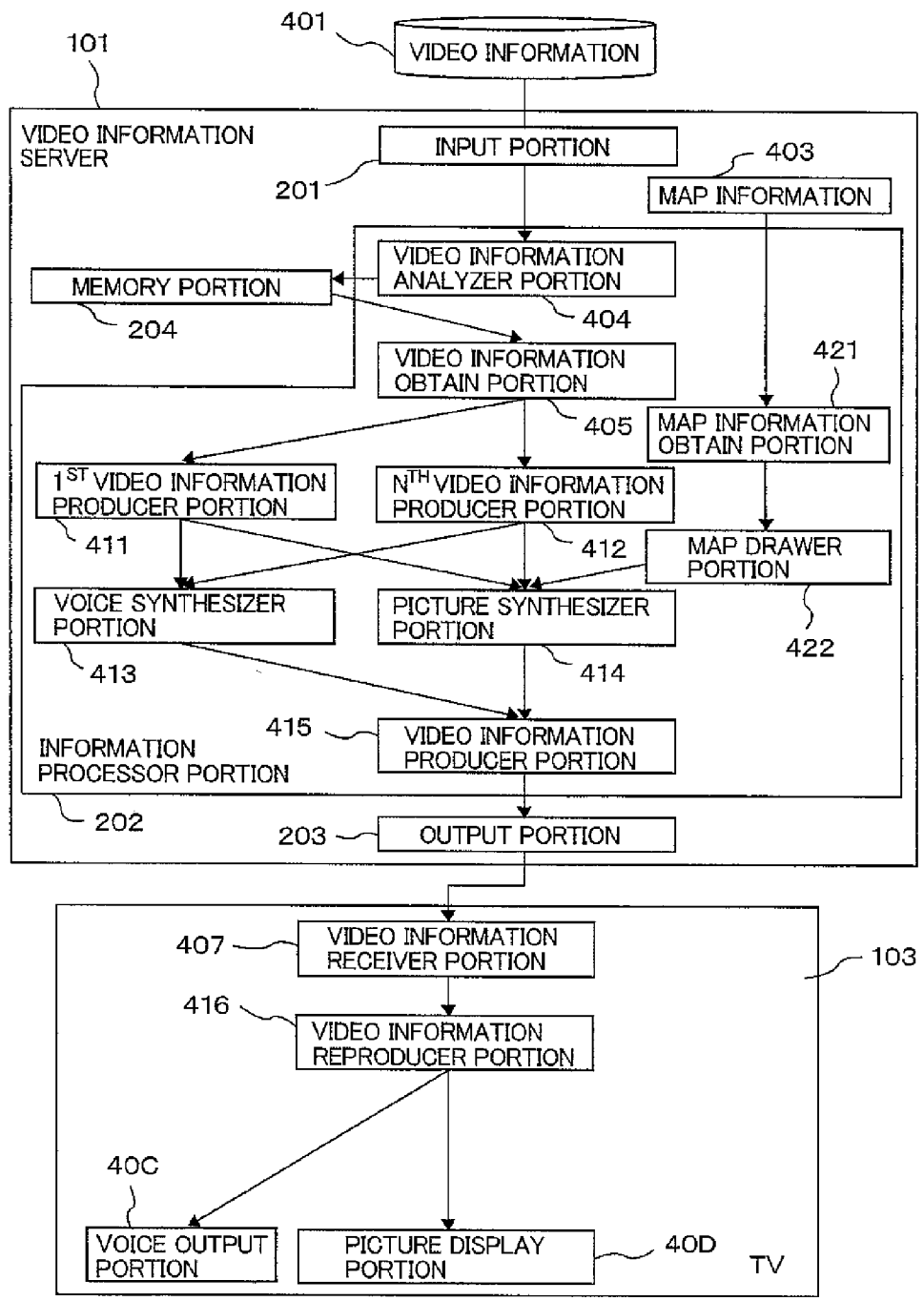
FIG. 13 shows an example of data flow in a third embodiment.

FIG. 13 shows an example of data flow in a third embodiment.

The information processor portion 202, in addition to those of the second embodiment, comprises a map information obtain portion 421 and a map drawer portion 422.

For example, when designation is made upon the time and the position by the user of the TV 103, as the perusal apparatus, the map information obtain portion 421 obtains map information 403 at the position designated. The map information may be memorized in the video information server 101, as is shown in FIG. 13, or may be obtained through the network, as another way.

The map information obtained in the map information obtain portion 421 is drawn in the map drawer portion 422.

Each of the pictures, which are reproduced in the first ($1^{st}$) video information reproduce portion 411 to the $N^{th}$ video information reproducer portion 412, are synthesized with the maps drawn in the map drawer portion 422, fitting to the position information owned by the respective video information, within the picture synthesizer portion 414.

From the synthesized maps, pictures and voices is produced one (1) piece of video information within the video information producer portion 415. The produced video information is outputted from the output portion 203 to the TV 103.

The video information outputted is received by the video information receiver portion 407 within the TV 103, and is reproduced in the video information reproducer portion 416. In the present embodiment, since synthesizing of the video information and the map information is conducted within the video information server 101, there is no necessity of the map receiver portion and the map drawer portion.

Other details are same to those of the second embodiment shown in FIG. 10, and therefore explanation thereof will be omitted herein.

Figure 14:
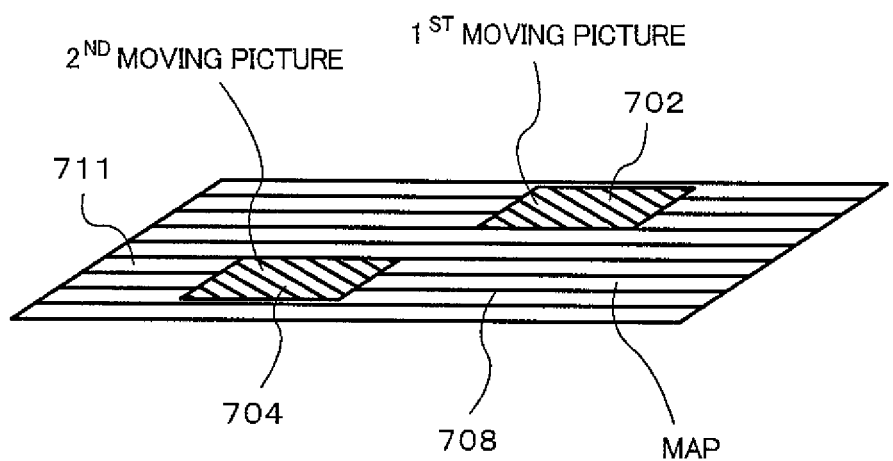
FIG. 14 shows an example of video layers according to the third embodiment.

FIG. 14 shows an example of the picture layer, which is reproduced in the video information reproducer portion 411.

The picture layer is only the moving picture layer 711, and reproduced synthesizing of one (1) piece of the compressed video information is displayed, which is synthesized in the video information server 101. The contents thereof includes the first picture 702 and the second picture 704, which are disposed fitting to the positions on the map of the map display area 708, so that they build up one (1) piece of picture information together with the map information.

Other details are same to those of the second embodiment, and therefore explanation thereof will be omitted herein.

According to the present embodiment, in addition to the effects obtainable from the first embodiment and the second embodiment, since synthesizing of the video information and the map information is conducted within the video information server 101, there is no necessity of the map information drawer portion and the picture synthesizer portion in the TV 103, as the perusal apparatus.

<Embodiment 4>

FIG. 15 shows an example of data flow in a fourth embodiment.

The information processor portion 202, in addition to those of the first embodiment, comprises a second video information producer portion 431. The second video information producer portion 431 has a function of producing second video information, for reducing calculation performances necessary when reproducing, comparing to the first video information, by means of reduction of pixel number of the video information, the picture compression, the voice compression, or changing the compression method.

For the inputted first video information 401, the second video information is produced in the second video information producer portion 431 within the information processor portion 202, and in the video information analysis portion 404 is conducted an analysis of associating the photographing time, the data address of the first video information and the data address of the second video information, which are photographed, and thereby producing the video information correspondence table.

The video information correspondence table, and the first video information and the second video information are memorized in the memory portion 204.

The video information obtain portion 405 obtains the time designated, and the data address of the second video information, which has the information of position, from among the video information correspondence table, which was memorized in the memory portion 204, and also obtains the second video information corresponding to the data address obtained. And, it outputs the obtained second video information from the output portion 203.

Other details are same to those of the first embodiment shown in FIG. 4, and therefore explanation thereof will be omitted herein.

FIG. 16 shows an example of a video information correspondence table 508, to which the second video information is added.

The first video information is photographed at the time from T_0 to T_10 of the standard time 501, and the address information 512 of the second video information, which are photographed at each standard time, are from FileA_SumOf_0 to FileA_SumOf_10.

For example, it can be seen that the address information of the second video information, which is photographed at the standard time T_6, is FileA_SumOf_6. Thus, it can be seen that the data addresses of the first video information and the second video information at the same time are associated with.

Other details are same to those of the first embodiment, and therefore explanation thereof will be omitted herein.

According to the present embodiment, by producing the second video information, which is changed in reduction of the pixel number, the picture compression, the voice compression, or the compression method of the video information, from the first video information, it is possible to reduce the calculation performances of the perusal apparatus, being needed when reproducing, comparing to the case of using the first video information.

<Embodiment 5>

Figure 17:
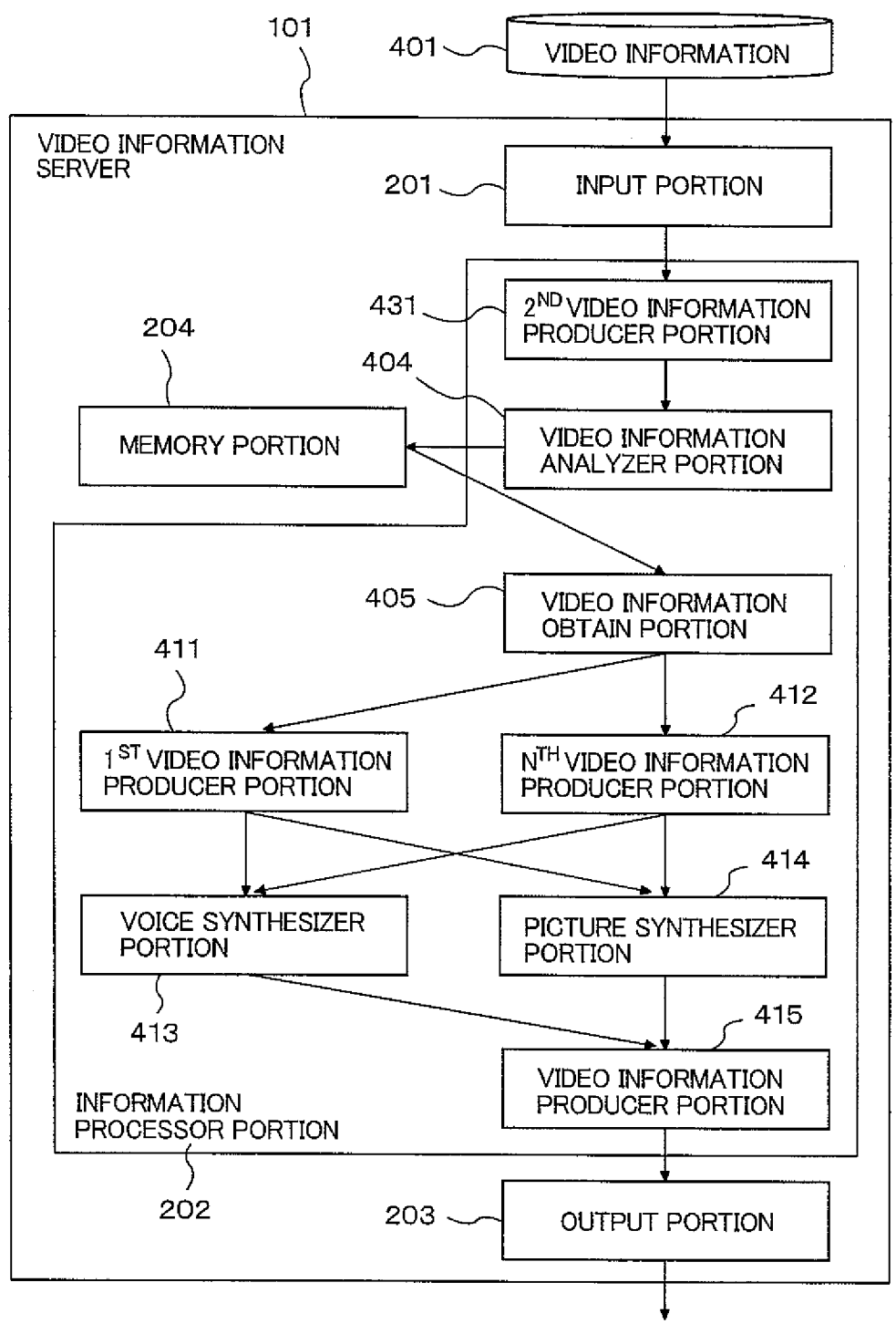
FIG. 17 shows an example of data flow in a fifth embodiment.

FIG. 17 shows an example of data flow in a fifth embodiment.

The information processor portion 202, in addition to those of the second embodiment, comprises a second video information producer portion 431.

The operations of the second video information producer portion 431 are same to those of the embodiment 4.

The video information obtain portion 405 obtains the second video information having the designated time and the position, from among the video information, which are memorized in the memory portion 204.

Other details thereof are same to those of the second embodiment, and therefore the explanation thereof will be omitted herein.

According to the present embodiment, it is possible to reduce a load, by reducing the performances necessary to the video information reproducer portion within the video information server 101.

<Embodiment 6>

Figure 18:
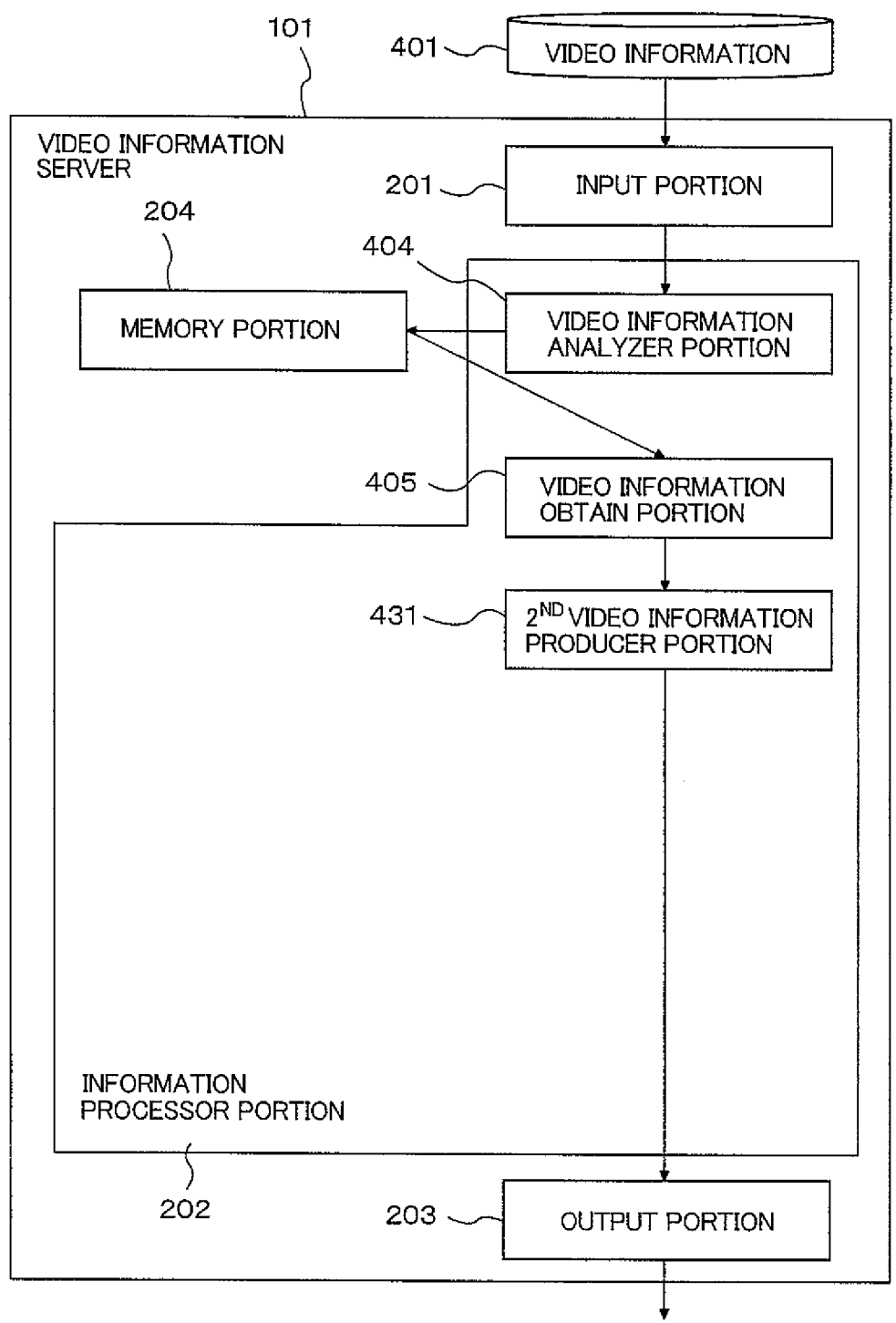
FIG. 18 shows an example of data flow in a sixth embodiment.

FIG. 18 shows an example of data flow in a sixth embodiment.

The information processor portion 202, in addition to those of the first embodiment, comprises a second video information producer portion 431.

The operations of the second video information producer portion 431 are same to those of the embodiment 4.

The video information obtain portion 405 obtains the second video information having the designated time and the position, from among the video information, which are memorized in the memory portion 204.

For the video information obtained, the second video information is produced in the second video information producer portion 431, and is outputted from the output portion 203.

Other details thereof are same to those of the first embodiment, and therefore the explanation thereof will be omitted herein.

According to the present embodiment, by producing the second video information, which is changed in reduction of the pixel number, the picture compression, the voice compression, or the compression method of the video information, from the first video information, it is possible to reduce the calculation performances of the perusal apparatus, being needed when reproducing, comparing to the case of using the first video information.

Also, since it is enough to memorize the data address of the first video information onto the video information correspondence table, it is possible to reduce the processes to be conducted in the video information analyzer portion.

<Embodiment 7>

Figure 3:
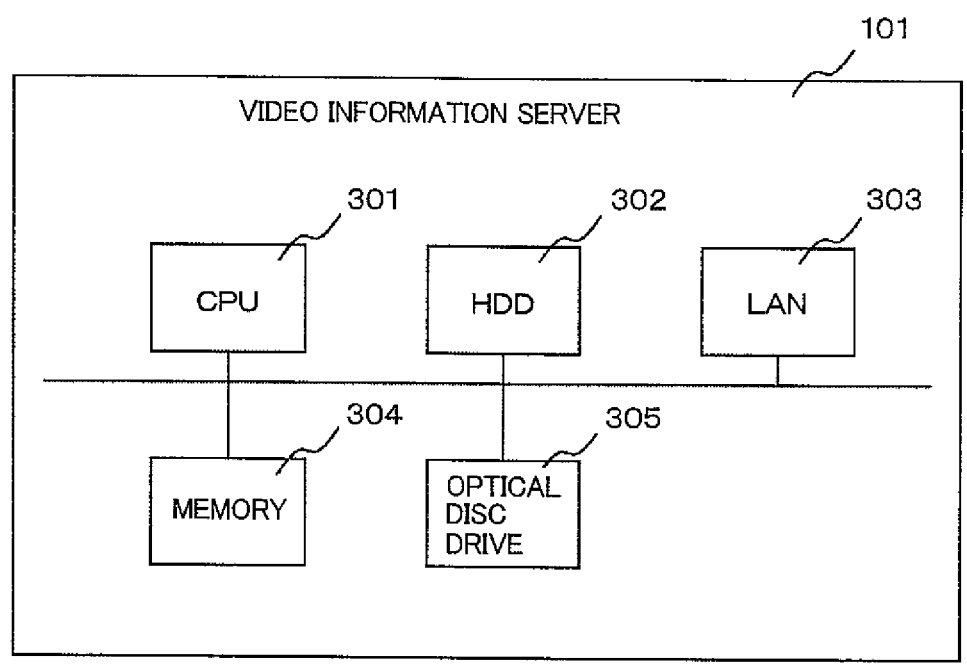
FIG. 3 is the configuration view of hardware for achieving a seventh embodiment.

FIG. 3 shows an example of the hardware configuration of an embodiment, which is achieved by applying a CPU 301 to the information processor portion 202 of the video information server 101 shown in FIG. 2, according to the first embodiment.

With the CPU 301 are connected a HDD 302, a LAN 303, a memory 304 and an optical disc drive 305.

The video information is inputted from the LAN 303 through the network.

Or, the video information may be inputted from the optical disc drive 305 of a readout apparatus, with using an optical disc, such as, a portable memory medium. However, the portable memory medium should not be limited only to the optical disc, but may be a removable HDD, a semiconductor memory, etc., i.e., may be equipped with a capable readout apparatus.

For the video information inputted, a control program operating on the CPU 301 produces the video information correspondence table for corresponding the photographing time, the data address of the video information, which is photographed at that photographing time, and the photographing position, and memorizes it onto the HDD 302 together with the video information. The present operation will be repeated every time when the video information is inputted.

When the time information and the position information are noticed through the LAN 303 from an equipment, which is connected with the network, the control program operating on the CPU 301 obtains the video information having the specific photographing time and the specific photographing position from among the video information, which are memorized on the HDD 302, and also outputs from the LAN 303.

Other details thereof are same to those of the first embodiment, and therefore the explanation thereof will be omitted herein.

With the configuration shown in FIG. 3, though various kinds of processes can be achieved by means of the CPU 301, which executes various kinds of programs stored within the memory 304, however each processor portion within the information processor portion 202 may be achieved in the form of hardware, such as, a circuit integrating each process therein, for example.

According to the present embodiment, with using the computer and the programs, it is possible to extract only the video information, which is photographed at the specific place and the specific time, from among the video information including the unspecified large number of pictures and voices, which are photographed at the unspecified time and the unspecified position, and the positions of which are moving during the photographing thereof.

<Embodiment 8>

Figure 12:
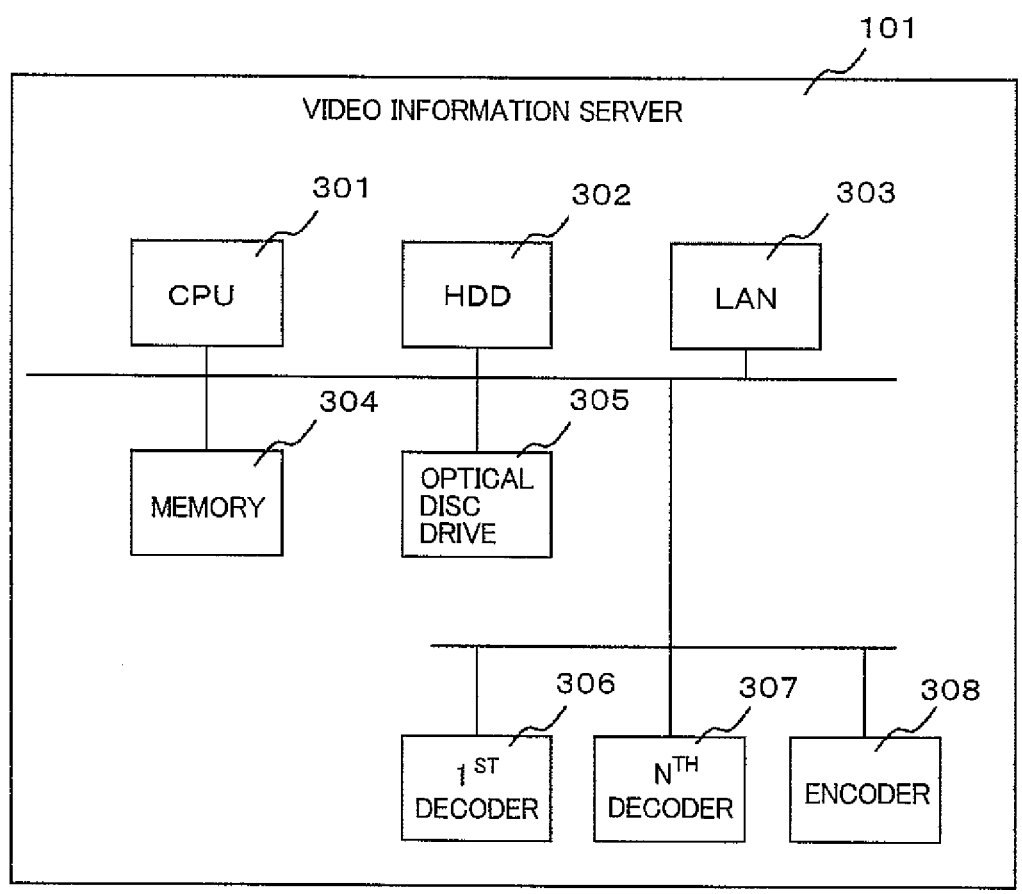
FIG. 12 is the configuration view of hardware for achieving an eighth embodiment.

FIG. 12 shows an example of the hardware configuration of an embodiment, which is achieved with hardware configurations of the first ($1^{st}$) video reproducer portion 411 to the $N^{th}$ video information reproducer portion 412, and the video information producer portion 415, within the information processor portion 202, which are explained in the second embodiment shown in FIG. 10.

In the present embodiment, in addition to the hardware configuration shown in FIG. 3 of the embodiment 7, with the CPU 301 are further connected a plural numbers of decoders 306, including a first ($1^{st}$) decoder 306 to a $N^{th}$ decoder 307, and an encoder 308.

By the control program operating on the CPU 301 is obtained the video information having the specific photographing time and the photographing position from among the video information, which are memorized on the HDD 302, and the time information are reproduced with synchronization thereof within the first decoder 306 to the $N^{-th}$ decoder 307, respectively, and after being synthesized in the memory, they are compressed within the encoder 308. The video information compressed are outputted from the LAN 303.

Other details thereof are same to those of the second embodiment, and therefore the explanation thereof will be omitted herein.

With the configuration shown in FIG. 12, though the CPU 301 executes the various kinds of programs, which are stored in the memory 304, so as to achieve the various processes, but each of the processor portions within the information processor portion 202 may be achieved in the form of the hardware, such as, a circuit integrating each process therein, for example.

According to the present embodiment, with using the computer and the programs, it is possible to extract only the video information, which is photographed at the specific place and the specific time, from among the video information including the unspecified large number of pictures and voices, which are photographed at the unspecified time and the unspecified position, and the positions of which are moving during the photographing thereof.

Also, it is possible to reduce a load of the CPU, by conducting the reproduction and the synthesizing of the video information in the form of hardware.

According to the plural number of the embodiments mentioned above, it is possible to extract only the video information, which is photographed at the specific place and the specific time, from among the video information including the unspecified large number of pictures and voices, which are photographed at the unspecified time and the unspecified position, and the positions of which are moving during the photographing thereof.

Also, upon multi-angle display of displaying a plural number of pictures, which are photographed at plural positions at the same time, simultaneously, such a display can be made, but without increasing the performances of the display apparatus.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A video information control apparatus, for controlling video information having photographing time information and photographing position information therein, comprising:
   an input portion, which is configured to input said video information photographed by a camera to a network;
   an information processor portion, which is configured to produce a video information correspondence table, for associating the photographing time of said video information inputted from said input portion, a data address of said video information, which is photographed at said photographing time, and a photographing position;
   a memory portion, which is configured to memorize said video information inputted from said input portion, and said video information correspondence table, which is produced in said information processor portion; and
   an output portion, which is configured to output said video information, wherein
   said information processor portion obtains the data address of said video information having a specific photographing time, when said information processor portion received a specific photographed position from a display apparatus connection to the network, from said video information correspondence table, which is memorized in said memory portion, and
   obtains said video information corresponding to the data address obtained; and
   outputs said video data obtained from said output portion.

2. The video information control apparatus, as described in the claim 1, wherein said information processor portion obtains the data address of said video information having the specific photographing time and photographing position, from said video information correspondence table, which is memorized in said memory portion;
   reproduces time information of at least one of said video information obtained with synchronization thereof;
   disposes reproduced pictures corresponding to pieces of said video information designated by a user fitting to said photographing positions on a map image, and synthesizes them into one (1) picture;
   synthesizes voices reproduced into one (1) voice;
   produces one (1) video information from the pictures and voices synthesized; and
   outputs the video information produced from said output portion.

3. The video information control apparatus, as described in the claim 2, wherein
   said information processor portion disposes the pictures reproduced fitting to positions on a map, when disposing them fitting to said photographing positions, and thereby synthesizing them into one (1) picture.

4. The video information control apparatus, as described in the claim 2, wherein
   said information processor portion produces the video information, so as to be the same in a screen size of equipment for display, or a reproduction method of corresponding picture and voice, when producing one (1) video information from the pictures and voices synthesized.

5. The video information control apparatus, as described in the claim 1, wherein said information processor portion
   produces second video information, upon which are treated with a reduction of pixel number, a picture compression, a voice compression, or a change of compression method, from first video information inputted from said input portion;
   produces the video information correspondence table, for associating the photographing time, the data address of said first video information, which is photographed at said photographing time, the data address of said second video information, and said photographing position, thereon;
   said memory portion
   memorizes said first video information inputted from said input portion, said second video information produced in said information processor portion, and said video information correspondence table, therein; and
   said information processor portion
   obtains the data address of said second video information having the specific photographing time and photographing position, from said video information correspondence table memorized in said memory portion;
   obtains said second video information corresponding to the data address obtained; and
   outputs said obtained second video information from said output portion.

6. The video information control apparatus, as described in the claim 5, wherein
   said information processor portion
   produces a second video information, upon which are treated with a reduction of pixel number, a picture compression, a voice compression, or a change of compression method, and also outputs said second video information produced, from said output portion.

7. The video information control apparatus, as described in the claim 1, wherein
   said video information is video information having the photographing time information, which is recorded by a video pickup apparatus having a position detecting function and a time controlling function, or
   a combination between the time information, which is recorded by a position detecting apparatus having a time controlling function, and the video information, which is photographed by a moving picture pickup apparatus having the position information and the time controlling function.

* * * * *